(12) United States Patent
Croak et al.

(10) Patent No.: US 7,852,832 B1
(45) Date of Patent: Dec. 14, 2010

(54) METHOD AND APPARATUS FOR PROVIDING SECURE INTERFACE TO EXTERNALLY HOSTED APPLICATION SERVERS

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1414 days.

(21) Appl. No.: 11/291,199

(22) Filed: Nov. 30, 2005

(51) Int. Cl.
*H04M 3/00* (2006.01)
*H04L 12/66* (2006.01)

(52) U.S. Cl. .................. 370/352; 379/188; 379/196

(58) Field of Classification Search .................. 370/352; 379/196, 188, 201.01
See application file for complete search history.

(56) References Cited

U.S. PATENT DOCUMENTS 7,440,442 B2 * 10/2008 Grabelsky et al. ........... 370/352
2003/0235281 A1 * 12/2003 Williams et al. ............ 379/196

* cited by examiner

*Primary Examiner*—Thjuan K Addy

(57) ABSTRACT

A method and apparatus for enabling a network provider to provide a security server in a packet network, e.g., a VoIP network that allows a third party partner to interface an application server hosted in the third party's network with the VoIP network infrastructure are disclosed. The security server provides the appropriate level of network address translations, firewall support, content filtering, and validation for the third party application server.

14 Claims, 4 Drawing Sheets

METHOD AND APPARATUS FOR PROVIDING SECURE INTERFACE TO EXTERNALLY HOSTED APPLICATION SERVERS

The present invention relates generally to communication networks and, more particularly, to a method and apparatus for providing secure interface to externally hosted application servers in communication networks, e.g., packet networks such as Voice over Internet Protocol (VoIP) networks.

BACKGROUND OF THE INVENTION

As VoIP network services grow, VoIP network service providers begin to offer third party partners the opportunity to use VoIP transport services for their own third party applications. These arrangements typically require VoIP service providers to allow third party partners to host their own applications in their third party network infrastructure. The VoIP network service providers will have access to the third party hosted application server from the VoIP transport network to interact with the hosted applications.

Therefore, a need exists for a method and apparatus for providing secure interface to externally hosted application servers in a packet network, e.g., a VoIP network.

SUMMARY OF THE INVENTION

In one embodiment, the present invention enables a network provider to provide a security server in a packet network, e.g., a VoIP network that allows a third party partner to interface with an application server hosted in the third party's network with the VoIP network infrastructure. For example, the security server provides the appropriate level of network address translations, firewall support, content filtering, and validation for the third party application server.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
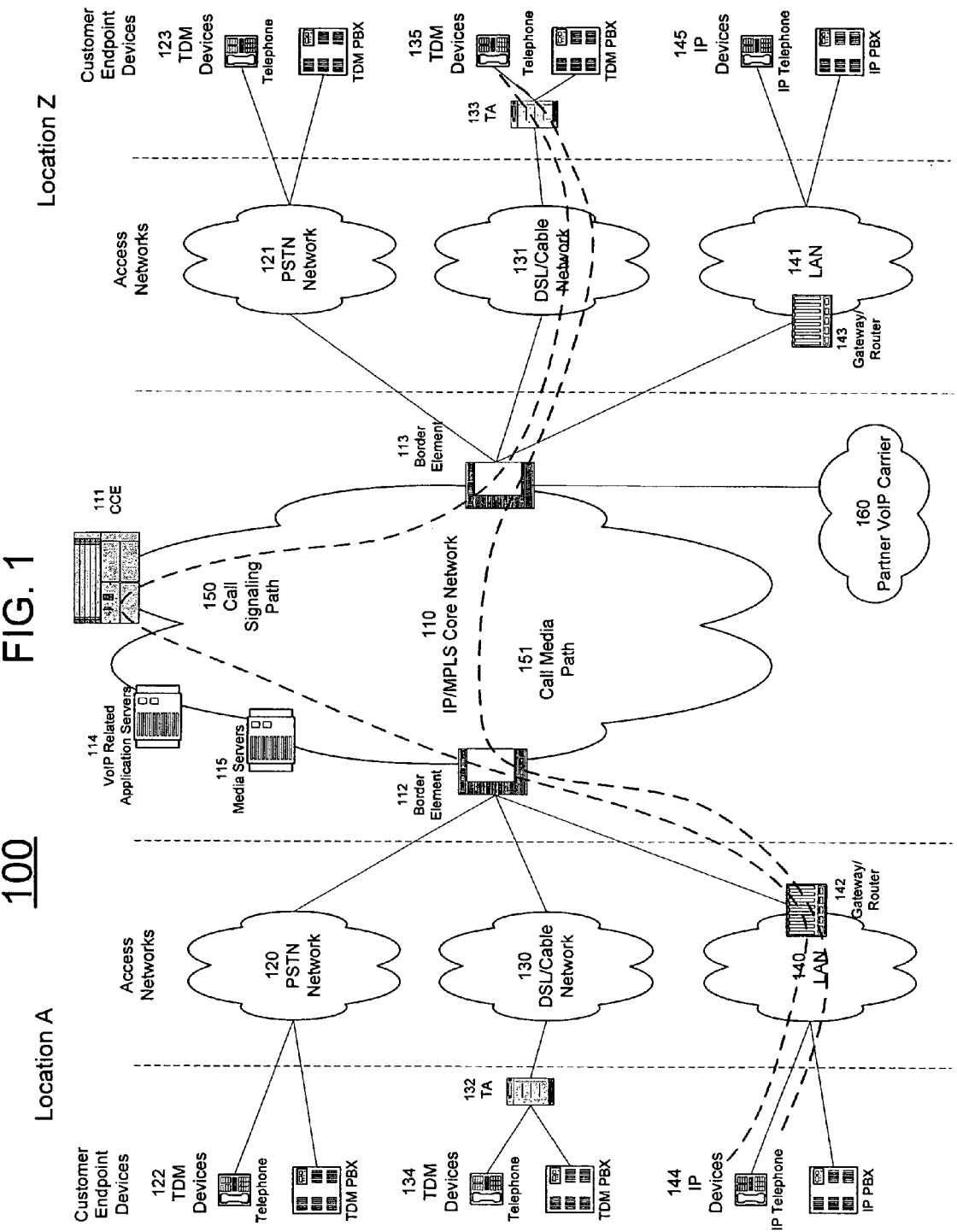
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

As VoIP network services grow, VoIP network service providers begin to offer third party partners the opportunity to use VoIP transport services for their own third party applications. These arrangements typically require VoIP service providers to allow third party partners to host their own applications in their third party network infrastructure. The VoIP network service providers will have access to the third party hosted application server from the VoIP transport network to interact with the hosted applications.

To address this need, the present invention enables a network provider to provide a security server in a VoIP network that allows a third party partner to interface an application server hosted in the third party's network with the VoIP network infrastructure. For example, the security server provides the appropriate level of network address translations, firewall support, content filtering, and validation for the third party application server.

Figure 2:
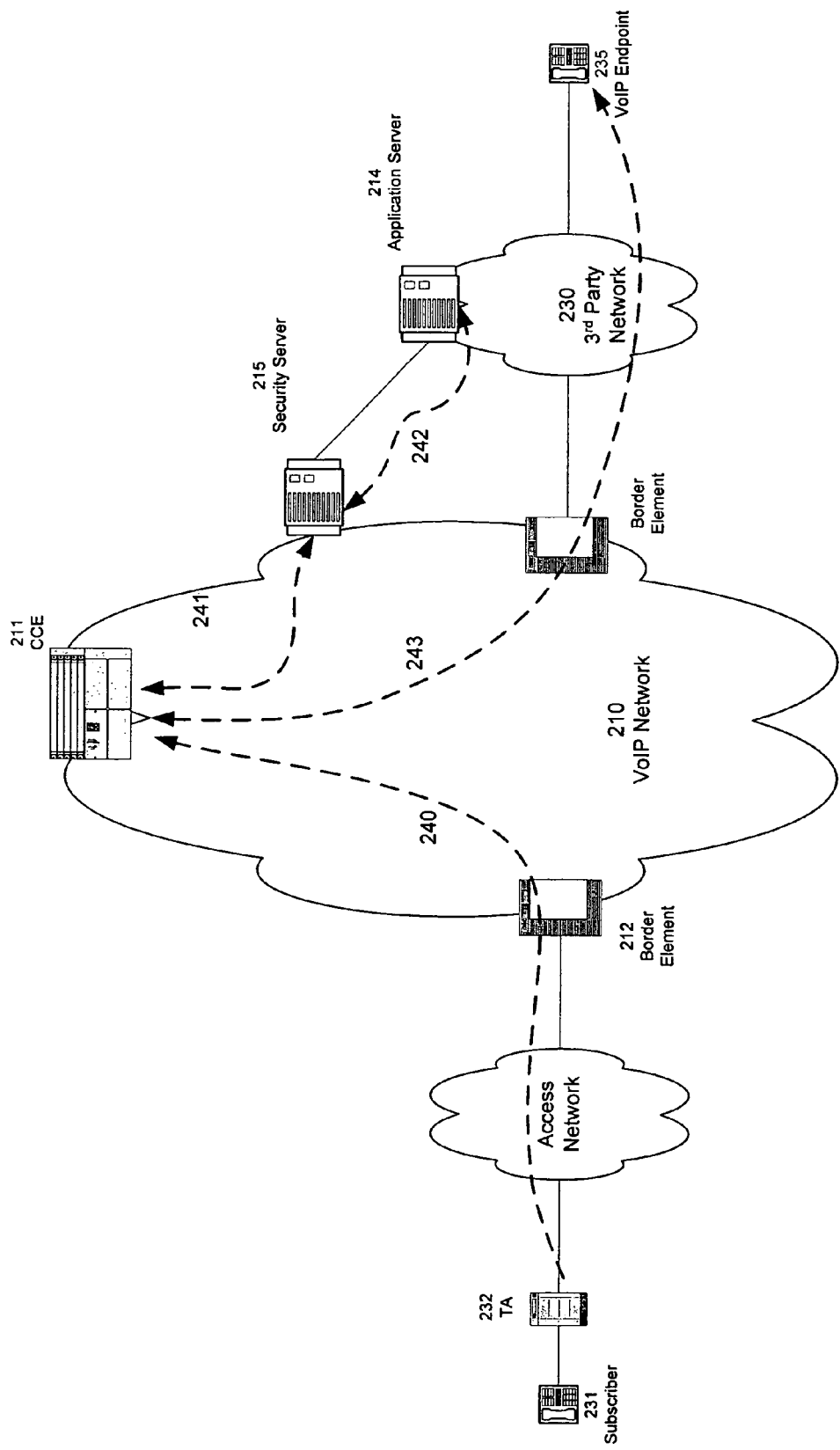
FIG. 2 illustrates an example of providing secure interface to externally hosted application servers in a VoIP network of the present invention.

FIG. 2 illustrates an example 200 of providing secure interface to externally hosted application servers in a packet network, e.g., a VoIP network of the present invention. In FIG. 2, the owner of $3^{rd}$ Party Network 230 is hosting AS 214 within $3^{rd}$ Party Network 230. AS 214 comprises applications and data that will be used to process calls destined to or originated from $3^{rd}$ Party Network 230. Since AS 214 is hosted in an external network from the point of view of VoIP network 210, AS 214 is therefore not allowed to directly communicate with CCE 211 for network security purposes. Therefore, a Security Server 215 is introduced to interface between AS 214 hosted in an external network and CCE 211 located within VoIP network 210. In one embodiment, Security Server 215 performs appropriate firewall, Network Address Translation (NAT), content filtering, and validation functions for communications between $3^{rd}$ Party Network 230 and VoIP network 210.

When subscriber 231 places a call to VoIP endpoint 235 located in $3^{rd}$ Party Network 230, TA 232 sends a call setup message to CCE 211 using flow 240. Upon receiving the call setup message, CCE 211 finds out that the call requires access to AS 214 to complete the call setup processing. CCE 211 communicates with Security Server 215 using flow 241 in order to reach AS 214. After the appropriate firewall, NAT, content filtering, and validation functions are performed, Security Serve 215 forwards communications to and from CCE 211 to AS 214 using flow 242. Once the necessary communication between CCE 211 and AS 214 has taken place, CCE 211 forwards the call setup message to VoIP endpoint 235 using flow 243 to complete the call setup process.

Figure 3:
FIG. 3 illustrates a flowchart of a method for providing secure interface to externally hosted application servers in a packet network, e.g., a VoIP network, of the present invention.

FIG. 3 illustrates a flowchart of an exemplary method 300 for providing secure interface to externally hosted application servers in a packet network, e.g., a VoIP network, of the present invention. Method 300 starts in step 305 and proceeds to step 310.

In step 310, the method receives a call setup message that requires interactions with a third party hosted AS. The call setup message is received by a CCE.

In step 320, the method forwards a request related to the call setup message processing to a security server for processing in order to reach the third party hosted AS. For example, the request is forwarded by the CCE to a Security Server.

In step 325, the method performs the appropriate firewall, NAT, content filtering, and validation functions on the request related to the call setup message processing received from the CCE. For example, the appropriate firewall, NAT, content filtering, and validation functions are performed by the Security Server.

In step 330, the method forwards the request related to the call setup message processing to the third party hosted AS for processing. For example, the request is forwarded by the Security Server to the third party hosted AS.

In step 340, the method receives a response from the third party AS. The response related to the call setup message processing is received by the Security Server.

In step 345, the method performs the appropriate firewall, NAT, content filtering, and validation functions on the response related to the call setup message processing received from the third party AS.

In step 350, the method receives the response related to the call setup message processing from the Security Server. The response related to the call setup message processing is forwarded by the Security Server to the CCE for processing.

In step 360, the method completes the remaining call setup process for the received call setup message. The method ends in step 370.

Figure 4:
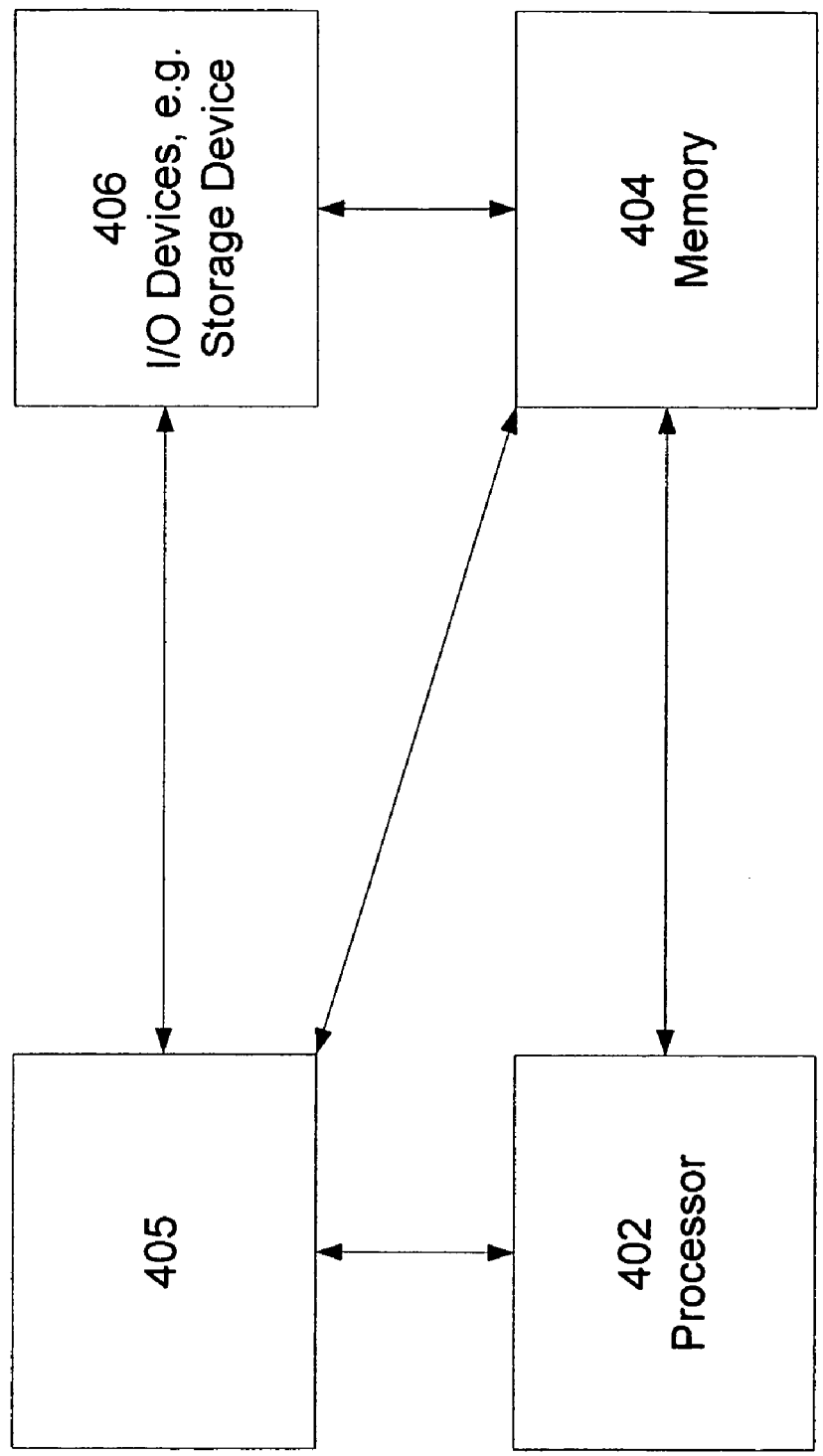
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing secure interface to externally hosted application servers, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing secure interface to externally hosted application servers can be loaded into memory 404 and executed by processor 402 to implement the functions as discussed above. As such, the present process 405 for providing secure interface to externally hosted application servers (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a secure interface in a communication network, comprising:
   receiving a call setup message that requires access to an externally hosted application server to complete a call setup, wherein the call setup message is received by a call control element; and
   communicating with the externally hosted application server via a security server to facilitate the call setup, where the security server is deployed within the communication network, wherein the communicating comprises:
      forwarding a call processing request related to the call setup message to the security server by the call control element;
      forwarding the call processing request to the externally hosted application server by the security server;
      receiving a response for the call processing request from the externally hosted application server by the security server; and
      forwarding the response to the call control element by the security server.

2. The method of claim 1, wherein the communication network is an Internet protocol network.

3. The method of claim 1, wherein the call processing request to the externally hosted application server is forwarded to the externally hosted application server after undergoing at least one of: a firewall function, a network address translation function, a content filtering function, or a validation function, that is performed by the security server.

4. The method of claim 1, wherein the response to the call control element is forwarded after undergoing at least one of: a firewall function, a network address translation function, a content filtering function, or a validation function, that is performed by the security server.

5. The method of claim 1, further comprising:
   completing the call setup by the call control element after communicating with the externally hosted application server.

6. A non-transitory computer-readable medium having stored thereon a plurality of instructions, the plurality of instructions including instructions which, when executed by a processor, cause the processor to perform steps of a method for providing a secure interface in a communication network, comprising:
   receiving a call setup message that requires access to an externally hosted application server to complete a call setup, wherein the call setup message is received by a call control element; and
   communicating with the externally hosted application server via a security server to facilitate the call setup, where the security server is deployed within the communication network, wherein the communicating comprises:
      forwarding a call processing request related to the call setup message to the security server by the call control element;
      forwarding the call processing request to the externally hosted application server by the security server;
      receiving a response for the call processing request from the externally hosted application server by the security server; and
      forwarding the response to the call control element by the security server.

7. The non-transitory computer-readable medium of claim 6, wherein the communication network is an internet protocol network.

8. The non-transitory computer-readable medium of claim 6, wherein the call processing request to the externally hosted application server is forwarded to the externally hosted application server after undergoing at least one of: a firewall function, a network address translation function, a content filtering function, or a validation function, that is performed by the security server.

9. The non-transitory computer-readable medium of claim 6, wherein the response to the call control element is forwarded after undergoing at least one of: a firewall function, a network address translation function, a content filtering function, or a validation function, that is performed by the security server.

10. The non-transitory computer-readable medium of claim 6, further comprising:
   completing the call setup by the call control element after communication with the externally hosted application server.

11. An apparatus for providing a secure interface in a communication network, comprising:
   a call control element configured to receive a call setup message that requires access to an externally hosted application server to complete a call setup; and
   a security server for communicating with the externally hosted application server to facilitate the call setup, where the security server is deployed within the communication network, wherein the call control element forwards a call processing request related to the call setup message to the security server, wherein the security server forwards the call processing request to the externally hosted application server, wherein the security server receives a response for the call processing request from the externally hosted application server, and the security server forwards the response to the call control element.

12. The apparatus of claim 11, wherein the communication network is an internet protocol network.

13. The apparatus of claim 11, wherein the call processing request to the externally hosted application server is forwarded to the externally hosted application server after undergoing at least one of: a firewall function, a network address translation function, a content filtering function, or a validation function, that is performed by the security server.

14. The apparatus of claim 11, wherein the response to the call control element is forwarded after undergoing at least one of: a firewall function, a network address translation function, a content filtering function, or a validation function, that is performed by the security server.

* * * * *